United States Patent
Klank et al.

[11] 4,127,103
[45] Nov. 28, 1978

[54] HEAT COLLECTING AND TRANSFERRING APPARATUS AND SYSTEMS ADAPTED FOR USE WITH SOLAR ENERGY

[76] Inventors: Benno E. O. Klank, 5639 Jay Rd., Boulder, Colo. 80301; James R. Jensen, Rte. 2, Box 507, Golden, Colo. 80401

[21] Appl. No.: 752,867

[22] Filed: Dec. 21, 1976

[51] Int. Cl.² .............................................. F24J 3/02
[52] U.S. Cl. ................................................. 126/271
[58] Field of Search ........................ 126/270, 271, 400; 237/1 A

[56] References Cited

U.S. PATENT DOCUMENTS

| | | | |
|---|---|---|---|
| 2,595,905 | 5/1952 | Telkes | 126/270 |
| 3,076,450 | 2/1963 | Gough et al. | 126/271 |
| 3,277,884 | 10/1966 | Rowekamp | 126/271 |
| 3,314,414 | 4/1967 | Rowekamp | 126/271 |
| 3,832,992 | 9/1974 | Trombe et al. | 126/270 |
| 3,991,742 | 11/1976 | Gerber | 126/271 |

*Primary Examiner*—Kenneth W. Sprague
*Assistant Examiner*—James C. Yeung
*Attorney, Agent, or Firm*—Earl C. Hancock

[57] ABSTRACT

Heat energy as from solar rays is collected by units including transparent plates covering a completely liquid filled chamber which has a heat absorbing layer as the internal surface of the chamber. The liquid is transparent and capable of absorbing, storing and/or transporting the heat energy. In one embodiment, the heat is removed to a storage tank from many such collector units by pumping. The system can allow draining of the collector when heat collection conditions do not prevail. In another embodiment of collector, the heat is transferred through the heat absorbing walls and the liquid medium acts mainly as a heat receiver and storing facility. A compartmentalized tank can be employed to enhance heat collection efficiency.

3 Claims, 7 Drawing Figures

U.S. Patent  Nov. 28, 1978  Sheet 1 of 2  4,127,103
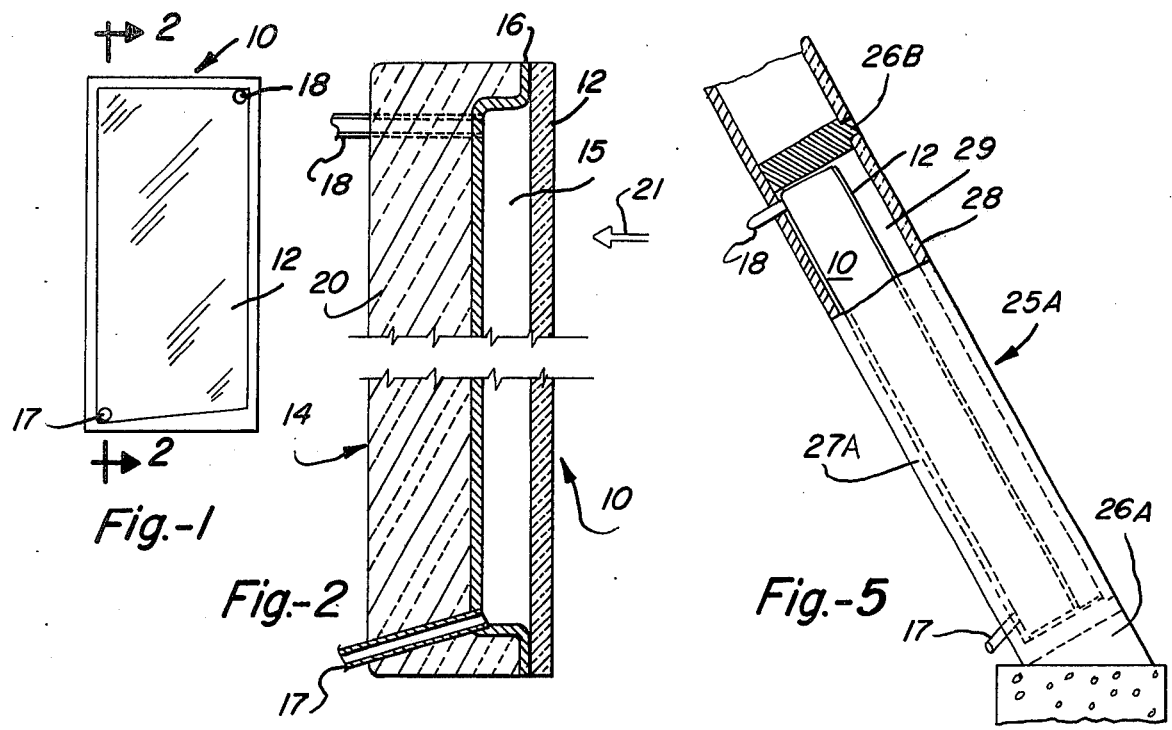
Fig.-1
Fig.-2
Fig.-5
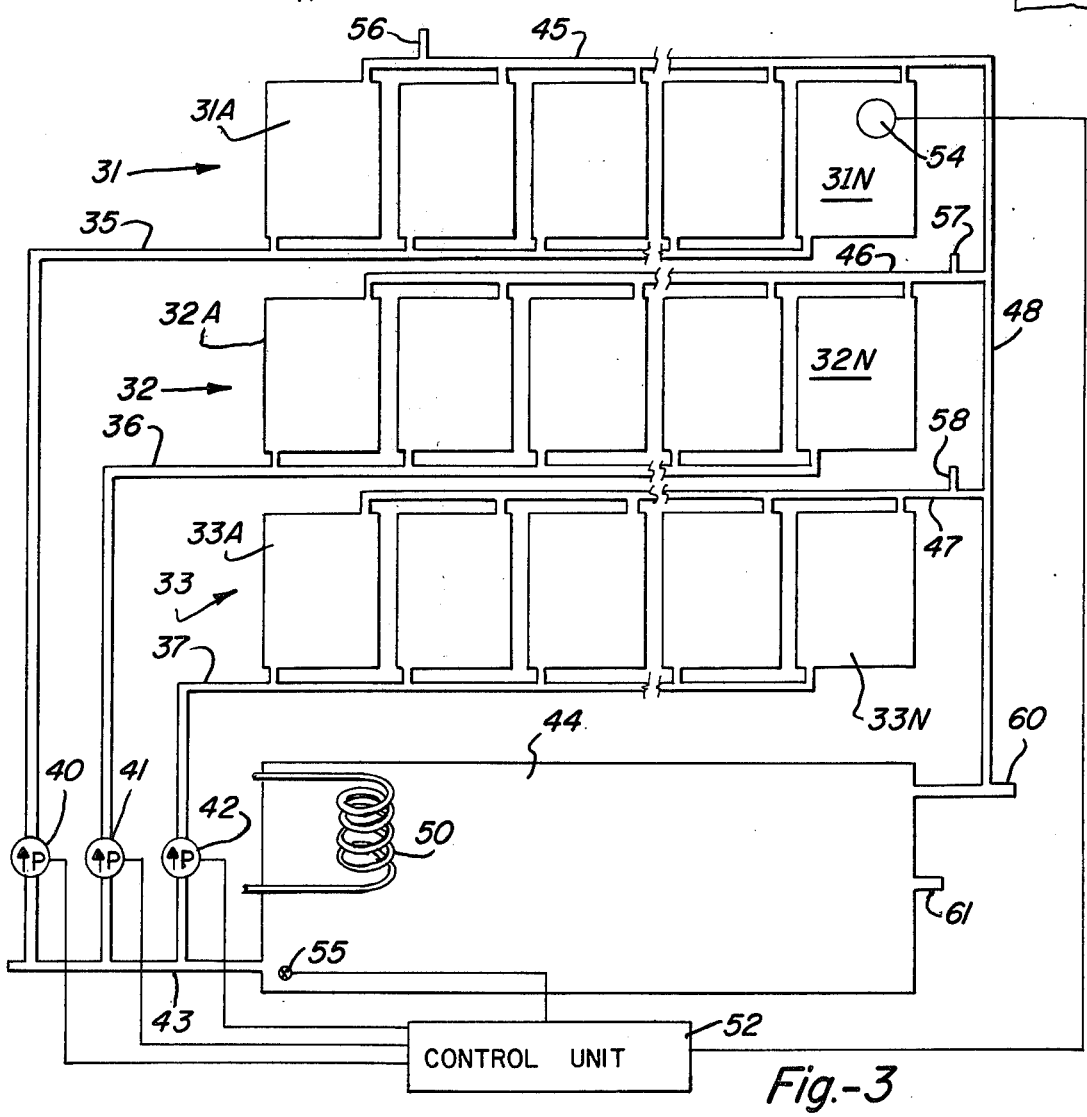
Fig.-3

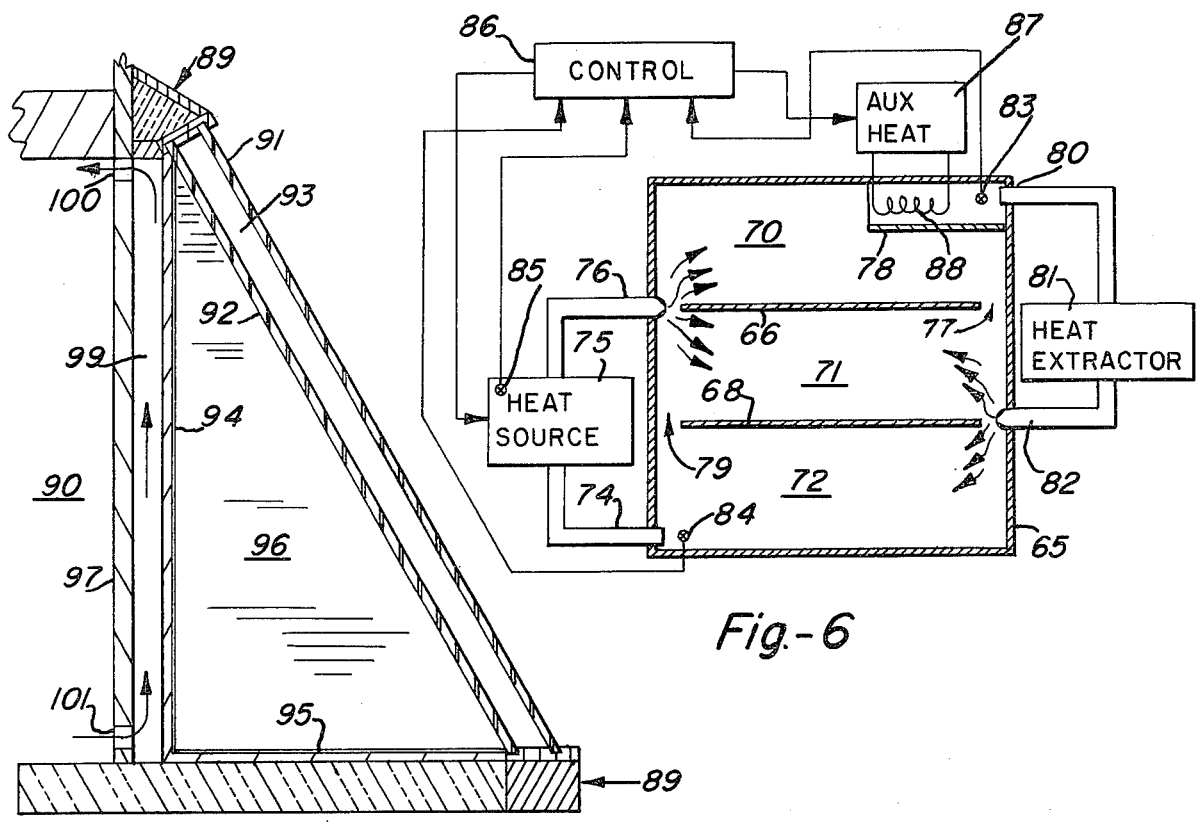
Fig.-6
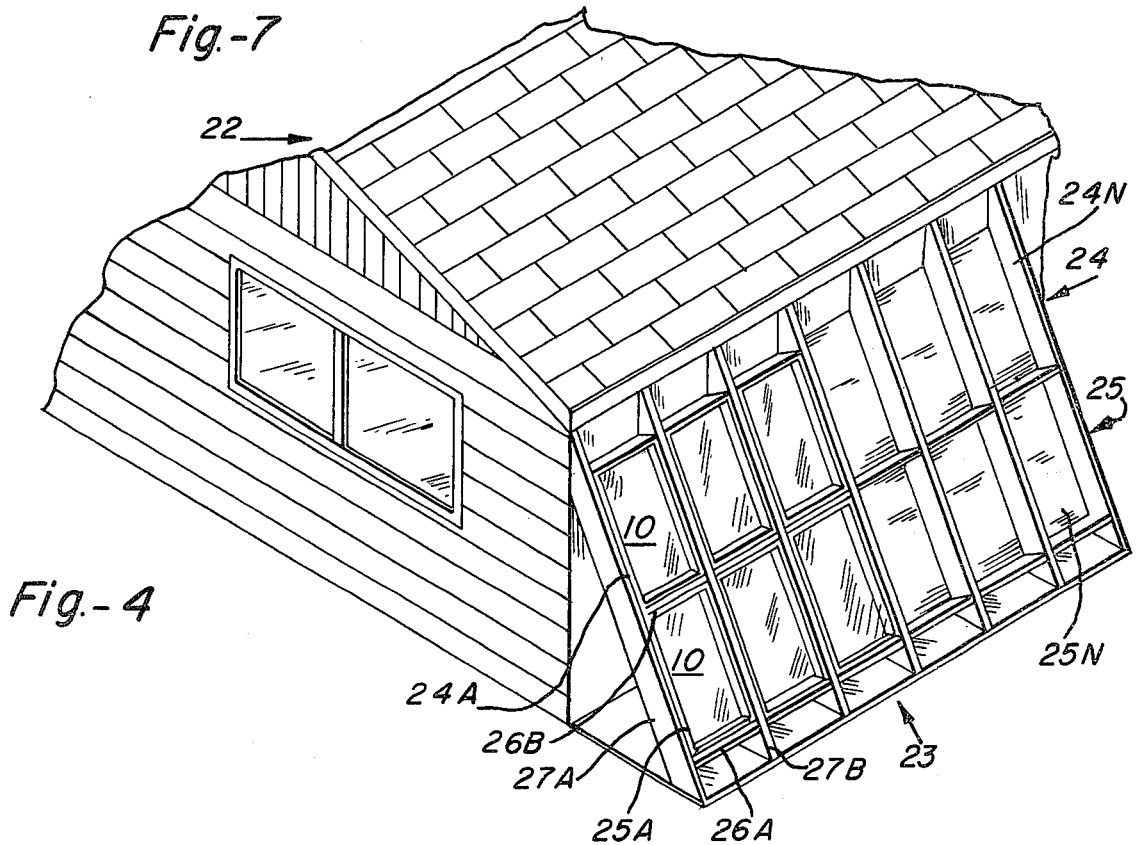
Fig.-7
Fig.-4

HEAT COLLECTING AND TRANSFERRING APPARATUS AND SYSTEMS ADAPTED FOR USE WITH SOLAR ENERGY

BACKGROUND OF THE INVENTION

The present invention relates to heat collecting, transferring and storing apparatus and systems especially useful in conjunction with solar energy. More particulary, the present invention relates to units and systems capable of trapping heat energy from solar rays and for transferring the heat energy for utilization at locations requiring same. The present invention is primarily useful for converting solar rays into heat energy required to meet any heat energy demand such as warming of buildings, heating water for usual hot water usage or the like. However, the invention can be employed in a reverse operation to provide cooling as will readily be understood by those having normal skill in the art.

The increased awareness of the limitations upon the resources of the earth per se for providing long term energy requirements in an environmentally compatible manner has caused serious consideration to be given to other energy source alternatives. One particularly intriguing alternate energy source is the solar rays. Various devices have been developed for the purpose of extracting heat energy from the sun. Furthermore, various heat storing and transferring systems have been developed to receive the heat from the extracting devices since the solar energy is frequently not available when most needed, namely at night and during overcase periods.

The greater heat absorbing characteristics of black or dark surface materials has been recognized for some time and all solar heat gatherers employ this phenomena to one extent or another. Although devices have been tried using parabolic concentrators and the like for heat collection, such devices tend to be impractical for most everyday heat requirements. Therefore, the more useful approach is to employ large, flat black surfaced panels with various schemes for the purpose of transferring the heat absorbed thereby. For instance, one prior art approach is to place an array of staggered black-coated panels behind a glass cover and to blow air over them for heating and movement to another location where the heat is transferred into a storing arrangement such as water tanks, rock pits or the like. Examples of collector units employing air over a heat absorbing layer are U.S. Pat. Nos. 2,484,127 by Stelzer, 2,680,565 by Lof, 3,832,992 by Trombe et al., 3,919,998 by Parker, and 3,948,247 by Heilemann. Others have attempted to use air flow over the rear of the heat asborbing collector plates as in U.S. Pat. Nos. 246,626 by Morse, 2,931,578 by Thompson and 3,893,506 by Laing. Still others have suggested using transparent blocks to reduce solar heat introduction to a room as in U.S. Pat. Nos. 3,107,052 by Garrison and B, 512,745 by Deminet et al. while yet other prior art devices have used heat absorbing, opaque fluid as the heat intercepting medium. However, for reasons pointed out in the detailed description below, none of these devices enjoy the efficiency of the collector elements in accordance with this invention nor do any known prior art systems suggest the advantageous controlled flow volume and drainable system of this invention nor the heat layer segregating storage tank hereof.

SUMMARY OF THE INVENTION

The present invention is concerned with apparatus for obtaining heat energy from solar rays and with systems and devices particularly well suited for use therewith. Solar collector panels constructed in accordance with this invention exhibit a significantly greater efficiency in heat recovery from solar rays than any prior art collector panels known heretofore. Further, the panels of this invention can be placed in a static installation and provide excellent operating reliability while requiring minimal maintenance.

A solar heat collector in accordance with this invention utilizes a substantially flat, light transparent plate which has an enclosure or housing attached to it in sealed relation. The enclosure forms a chamber underlying the transparent plate with a solar ray heat absorbing layer as at least a portion of the inner surface of the chamber. This chamber is filled between the plate and heat absorbing layer with a substantially light transparent liquid medium. This results in maximum heat transfer into the liquid medium from the absorbing layer and also in a minimum of heat loss as a result of the internal light reflecting and infrared absorption characteristics as will be discussed in greater detail with the preferred embodiment descriptions. Thus the efficiently trapped heat energy can be advantageously utilized by transfer to a remote location as by pumping the liquid medium through entry and exit ports in the collector panel, transferring heat through the heat absorbing layer or the like. When entry and exit ports are used, the panel can be formed with these ports location for insuring full drainage of the panel whenever solar energy is not available.

One system of this invention useful in conjunction with one or more of the collector panels employs conduits and pumping means for exchanging the liquid medium between the panel or panels and a storage tank. By including a control unit responsive to conventional temperature sensors at the panel and the tank, the pumping means can be enabled by the control unit so that the heat collecting will occur only when the temperature differential is favorable while the volume pumped can be proportioned to the temperature differential. Further, the system can include pressure release devices such that the entire panel and conduit array will drain at any time the pumping means is not enabled. This not only removes potential freezing hazards but also reduces the time delay in initiating heat recovery since the liquid medium will be absent from thepanels at all times that positive heat transfer thereto is not possible.

Yet another novel feature of this invention resides in an efficient heat storage tank arrangement wherein the tank includes baffles for horizontally segregating the layers by temperature. The baffles allow layer communication by edge openings. Heat sources and heat extractors are coupled to return their liquid medium at the edge opening boundaries thereby insuring that the warmest medium is separated at the top and the coolest medium at the bottom layer.

The foregoing and other features, advantages, objects and applications of this invention will be more readily apparent in view of the following detailed description of various exemplary preferred embodiments as taken in conjunction with the accompanying drawings.

BRIEF DESCRIPTION OF THE DRAWINGS

FIG. 1 is a front view of a solar heat collector element.

FIG. 2 is a section view of the FIG. 1 collector element.

FIG. 3 is a schematic diagram of a heat collector system employing a plurality of heat collector elements.

FIG. 4 is a perspective view of a collector panel mounting frame for use with a building.

FIG. 5 is a partially sectioned and broken view of a portion of the FIG. 4 mounting structure.

FIG. 6 is a heat collecting and distributing system with a heat separating taken; and FIG. 7 is an alternate embodiment of a solar heat collector.

DETAILED DESCRIPTION OF THE PREFERRED EMBODIMENT

An exemplary implementation of a basic solar heat collector element 10 is shown in front plane view in FIG. 1 and in broken and section view in FIG. 2 but various arrangements for constructing similarly functioning elements will be readily apparent in view of the following discussion of the element shown. In the example shown, solar heat collector 10 is preferably formed as an integral unit with light transparent plate 12 bonded or otherwise secured in water-tight relation to rear portion 14 so that a chamber 15 is defined therebetween. Plate 12 can be of glass, light transmitting plastics, fiberglass, clear acrylic plastic sheet or any suitable light transmitting material. Although an additional light transparent plate 28 is shown in FIG. 5 as part of the mounting superstructure, it will be recognized that such an additinal plate could be included as an intergal part of the collector unit 10 per se. As will be apparent from the discussion of FIG. 5, the added plate provides additional insulation by establishing a dead air space. It may be desirable under some circumstances to omit this additional plate altogether since the dead air space operates predominantly for static heat transfer insulation.

Rear portion 14 of unit 10 includes a light absorbing layer 16 sealed at its peripheral edges to plate 12 so as to define a sealed chamber 15 therebetween which can be selectably filled with a heat-carrying liquid. The liquid is preferably water which may further contain algae inhibiting substances, antifreeze compounds or other elements such as to improve the heat transfer and/or heat retention characteristics of the liquid. The light absorbing layer 16 is preferably dark such as black fiberglass, plastic or metal but could be merely a black painted surface on metal or a black epoxy resin. The heat transferring liquid is introduced to chamber 15 via inlet port 17 and removed from chamber 15 by outlet port 18. A slight downward slope towards port 17 can be included as is evident in FIG. 1 for drainage purposes. The typical rear portion 14 includes an insulating layer 20 of foam plastic, fiberglass or other suitable material. Note that the light absorbing member 16 could be an appropriately adhered foil, film or other surface on the interior area of layer 20.

In use, the collector 10 is preferably positioned so that the solar rays as shown symbolically at 21 in FIG. 2 establish optimum perpendicular incidence to the surface of element 10 during the periods ranging around the winter sun. This will vary depending upon the geographic location of the collector but, by way of example, would be about 55° to 60° from horizontal for 40° latitude.

A typical collector element constructed in accordance with the exemplary embodiment of FIGS. 1 and 2 would be 2×4 feet in outer dimension (i.e.: the surface generally facing towards the sun) with the liquid chamber 15 being about 0.25 to 0.5 inches deep (i.e.: between the facing interior surfaces of members 12 and 16) with insulator layer 20 being about 4 inches or more of fiberglass or 2 inches or more of plastic or urethane foam. The additional outer plate (when used) is of glass, fiberglass sheet, Tedlar film or similar material or any desired thickness spaced about 0.5 inches from plate 12 which can be typically 3/16th inch flat or tempered glass. The spacing between members 12 and 16 can be maintained by standoffs bonded therebetween if necessary.

The advantages of the present invention over the prior art can best be appreciated by consideration of some theoretical background. It is known that a hot body loses heat to its environment through conductive and convective losses as well as through radiative heat losses. Considering conductive and convective heat losses first, the amount of heat lost per area and time, $Q_c$, is proportional to the temperature difference ($dT$) between the hot body and its environment times a constant, $k$, where "$K$" for a half inch dead air space between double glass typically is 0.5 Btu/hour-sq.ft.-deg.F. Thus a collector with 0.5 inch spaced double glazing at 50° F above ambient temperature will lose about 25 Btu per square foot per hour due to conductive and convective losses. Operated at other levels from ambient, the losses will vary proportionally such as 50 Btu per square foot per hour for a 100° F difference from ambient.

For radiative heat losses, the amount of heat radiated ($Q_r$) from a black surface increases with the fourth power of the absolute temperature, $T$, of this surface. That is, $Q_r$ equals T to the fourth power times $g$ where $g$ is $1.797 \times 10^{-8}$ Btu per hour per square foot per degree Kelvin to the fourth power. This means the radiation emitted by the black surface of a collector operating at 130° F(327.6° K) is equal to 207 Btu per squar foot per hour. The intensity of this radiation beaks at a wavelength of 8.8 microns. With the operating temperature increased to 180° F(355.4° K), the heat raidated per square foot per hours becomes 287 Btu and the intensity peak is shifted to a wavelength of 8.1 microns. The intensity distribution plotted against wavelength is generally a bell curve around the peak wavelength.

Some further consideration of the heat loss factors $Q_c$ and $Q_r$ mentioned above illustrates the significance of the advantages of the present invention as compared to the prior art collectors during typical operating conditions of a winter day. For instance, assume a 30° F ambient temperature and the collector operating temperatures in accordance with the following table.

| Operating Temperature | 130° F | 150° F | 180° F |
| --- | --- | --- | --- |
| $Q_c$ | 50 | 60 | 75 |
| $Q_r$ | 207 | 236 | 287 |
| Total Heat Losses | 257 | 296 | 362 |

Note that the computation of $Q_r$ assumes that the black collector surface radiates freely into space. Since under typical conditions energy deposited on the collector by the sun for much of the time is limited to less than 250 Btu per square foot per hour, such a freely radiating collector under those conditions would not reach 130° F since otherwise heat losses would be greater than heat received from the sun. It also becomes apparent that the best way to increase efficiency of a collector at higher operating temperatures is by decreasing the radiative heat loss $Q_r$ which is by far of greater significance than the conductive and convective heat losses $Q_c$. As will be appreciated, the present invention significantly reduces the radiative heat losses by infrared absorption in the collector medium and by total internal reflection of the infrared radiation.

Water and glass are relatively transparent for short-wave infrared radiation and become less transparent and even opaque for long-wave infrared. For example 0.25 inch glass will transmit about 70% of the short-wave infrared but becomes less transparent until it becomes opaque at between 3 to 5 microns, depending upon the variety of glass used. The amount of heat re-radiated from a black collector surface can be greatly reduced by the present invention, particularly via the black surface of 16, the transparent plate 12 and the intimate filling of the chamber therebetween by the heat transfer liquid such as water. Four significant advantages of the present invention are presented below.

I. Any radiation from the black surface of 16 (i.e.: heat radiation or unabsorbed sunlight) must pass through the heat collection liquid transfer medium before escaping through the glass 12. Part of this radiation and particularly the long-wave infrared is absorbed by the liquid medium thereby depositing its heat energy in the transfer medium instead of being lost back into space outside of the collector. This advantage can be further enhanced by including additives in the liquid medium which leave it transparent for the incoming sunlight while increasing the opacity thereof for outgoing infrared. For instance, this can be accomplished when water is the transfer medium by adding a combination of water-soluble salts with broad absorption bands in the infrared covering the wavelengths above 3 microns.

II. The radiation from the black surface of 16 which has not been absorbed by the heat collection-transfer liquid medium encounters the interface between the liquid medium and plate 12. The long-wave infrared (e.g.: greater than 4 to 5 microns) is absorbed by glass 12 thus depositing heat in the glass which then returns part of this heat back into the liquid medium. Since glass is transparent to short-wave infrared, the short-wave remainder of the radiation reaches the interface between the outer surface of plate 12 and the dead air space (see 29 in FIG. 5). Since the refractive index for water and glass do not differ substantially (about 1.33 and 1.53, respectively), much of this radiation will exhibit an angle of incidence large enough to be subjected to the process known as Total Internal Reflection. A mathematical analysis shows that two-thirds of this radiation is reflected back into the collector thereby being absorbed by the liquid medium and the member 16.

III. Whenever light travels across the interface between two transparent media there is some reflection. However, the indices of refraction for glass and water are sufficiently close that considerably less light is reflected at the interface between plate 12 and the water medium than is reflected at a glas-to-air interface. In the collectors in accordance with the present invention, about 5% more light will enter into the collector through the plate 12 to liwuid medium interface as compared to a collector having air or gas on the inside of this interface. In addition, light will be refracted less at the plate 12 to liquid medium interface thus resulting in better absorption at the black surface member 16 because of a closer to normal incidence.

IV. The water is in direct contact with the absorbing surface thus increasing collection efficiency by eliminating the need for heat transfer through a material that contains the water as in collectors wherein the water flows in pipes or is sandwiched behind the collector surface.

In one type of prior art collector, a transparent plate is separated from a black surface by dead air space with the heat transfer medium being on the opposite side of the black surface. Advantage I above is lost to such devices since the air is transparent to the infrared. Further, the re-radiated long-wave infrared is absorbed in the initially encountered glass but is then lost primarily to the colder exterior. The reflection at the inner air to glass interface is the same as the glass to outer air interface, the angles of incidence on the outer interface will, therefore, be too small for total internal reflection thereby denying Advantage II for such devices. Furthermore, Advantage III is missing since the interface internally to the glass is with air. Finally, Advantage IV is missing since heat absorbed in the internal black surface must be transferred through the backing plate surface must be transferred through the backing plate thereof before reaching the collection medium.

Yet another type of prior art solar collector uses an opaque liquid medium behind a transparent plate. In this case, Advantage I is missing because the re-radiation of infrared takes place at the glass to opaque medium interface. This means the infrared radiation does not pass through the transfer medium before being returned to the atmosphere and consequently is lost. Additionally, since sunlight absorption and the resulting heat production takes place at the glass-to-opaque liquid interface, there is no spatial separation of surface layer to reduce conductive and convective heat losses, an advantageous result obtained through the present invention by the water layer between the initial glass plate 12 and the black surface of member 16.

In comparative experiments as between the collector of the present invention and the prior art collectors using a water transfer medium behind the heat absorbing surface and dead air space, the collector of this system at high operating temperatures collected as much as 30% more heat energy per unit time and area, particularly on days of clear skies and bright scattered cloud conditions. The difference in efficiency varies with atmospheric conditions and operating temperature. When averaged for varying conditions, the collector in accordance with this invention performed 20% better than the prior art device in that the invention averages 180 Btu/square foot hour while the prior art device produced an average of 150 Btu/square foot hour. With the use of opaque water in the collector of this invention similar to the other above-mentioned prior art device, the collector efficiency decreased. In these experiments, the collector of this invention reached the boiling point of water, still collecting as much as 150 Btu per square foot hour at these high operating temperatures with a typical ambient temperature of 57° F.

In a typical installation, a plurality of individual solar heat collector units as shown in FIGS. 1 and 2 are arrayed in a grid pattern by an appropriate supporting structure such as that shown associated with building 22 in FIGS. 4 and 5. The panel array supporting framework 23 is preferably large enough to hold the desired number of these panels as in rows 24 and 25 and is constructed such that each panel can be set into its own compartment 24A-24N and 25A-25N in the supporting structure 23. The detail of compartment 25A is shown in partially broken and sectioned view in FIG. 5 with a collector element 10 therein, the latter not being shown broken or sectioned. When collector panel 10 is in place in its compartment 25A, the front surface of plate 12 is slightly over 0.5 inch below the surface of the supporting structure members 26A, 26B, 27A and 27B. An outer transparent plate 28 is then installed 0.5 inch (or more) above plate 12 and sealed to the supporting structure members 26 and 27 so as to define the dead air space 29. The supporting structure is also preferably deep enough to accommodate the insulation 20 thickness after the individual panels have been put in place and interconnected. As shown in FIG. 5, the back of the supporting structure is covered with a suitable material such as plywood, masonite or the like and the bottom secured to a footing or otherwise held in place. Framework 23 is placed on (or integral with) the south wall and/or roof of building 22 although it could be constructed as a detached or detachable unit. Members 26 and 27 can be 2×4 or 2×6 wood beams although additional depth for added insulation is desirable if frame 23 is used as part of a roof in a stand-alone arrangement. The ends of framework 23 are closed by suitable materials and the ports 17 and 18 appropriately interconnected as will be evident from the subsequent discussion for FIG. 3.

FIG. 3 illustrates a schematic layout of an exemplary operating system utilizing a grid of collector elements retained in place by an appropriate supporting structure (not shown). The array or grid of panels in this example includes three rows 31-33 of panels 31A-31N, 32A-32N and 33A-33N. The inlets for each panel (e.g.: 17 in FIGS. 1 and 2) of each row are connected in parallel to appropriate cold water inlet manifolds 35, 36 and 37 which are supplied by respective pumps 40, 41 and 42 drawing from main reservoir 44 via feeder pipe 43. Thus cold water is withdrawn from tank 44 by pumps 42-42, forced into the inlet of each associated panel where it is heated as discussed previously herein, exited into the hot water manifolds 45, 46 and 47 and returned to tank 44 via collection pipe 48. Within reservoir tank 44 is a heat exchanger 50 if this should be preferred for utilizing the accumulated heat elsewhere without directly employing the liquid of the heat collection system shown.

A master controller 52 receives input signals from temperature sensors 54 and 55. When the temperature of sensor 54 which is detecting the environmental temperature within the panels is higher by a predetermined amount than the coldest level in tank 44 as sensed by detector 55, controller 52 applies appropriate energizing power to pump motors 40-42. The speed of pumps 40-42 is varied by controller 52 in accordance with the magnitude of the temperature difference between sensors 54 and 55. This increases the efficiency of heat recovery from the panel array 31-33. If the temperature at sensor 54 becomes colder than the storage/transfer tank 44 temperature as detected by sensor 55, the pump or pumps 40-42 are shut off and the liquid in the pipes and manifolds 35-37 is allowed to drain back through the pumps or through pump bypass valves into the tank 44. This effectively leaves the collector panels 31-33 dry under any condition that the pumps are not running thereby eliminating any freezing hazard. Furthermore, by draining the panels when heat collection cannot be gainfully realized, the time required to heat the water in the panels is reduced since that volume of liquid need not be heated from approximately ambient temperature as would be the case if it were continuously pumped even when heat collection is not possible or if the liquid were left in the panels when the pumps are off.

Vacuum breaks 56, 57, and 58 are coupled in-line with respective manifold sections 45, 46 and 47 to allow liquid to drain from the collector panels 31-33 whenever the controller 52 determines that the temperature differentials do not indicate that satisfactory heat transfer can be accomplished. Further, vacuum breaks 56-58 serve as pressure relief outlets should the fluid pressure in collector panels 31-33 become too high.

In installations of collector panels involving multiple horizontal rows of collectors stacked vertically as is depicted for three rows in FIG. 3, a separate pump is preferably employed for each row. This permits the fluid pressure on each row to be maintained within the structural limits of the collector panels thereof. By using positive displacement pumps so that a constant volume per unit time of liquid is introduced to each row, the flow rate through all rows can be equalized despite differences of head pressure between the rows. Note that the heated water from the collectors can be diverted via valve 60 if desired and the cooled water returned into port 61. The collected heat can likewise be extracted by a conventional exchanger 50 as mentioned or utilized in any suitable manner. Further, a level sensor can be included within tank 44 and replenishing water added as needed such as by means of ports 60 or 61.

A particularly advantageous heat collecting and transferring system is shown in partial schematic form in FIG. 6. Tank 65 is square or rectangular in cross-section although it could be circular or of any suitable configuration. Tank 65 is maintained completely filled with the heat storage/transfer liquid by means not shown but which are well known such as expansion tanks and level sensor controlled replenish/drain devices. Suspended in fixed relation between the front wall (not visible in FIG. 6) and rear wall of tank 65 but with openings at each side as shown are a pair of baffles 66 and 68. Baffles 66 and 68 are of heat insulating material for the purpose of reducing heat exchange particularly via convection between the three zones 70, 71 and 72. Outlet 74 is located at the coldest point in tank 65 to provide water input into heat source 75 which can be a solar collector array or any other source of heat. The heated water is returned to tank 65 at inlet 76 which is preferably an elongated nozzle so as to reduce the velocity of the water as it is discharged into tank 65. Thus the output of nozzle 76, if warmer than the water in zone 70, will tend to rise into zone 70 thereby maintaining the highest temperature in zone 70. Cooler water thus displaced from zone 70 will flow into zone 71 through side opening 77. Water from nozzle 76 which has not reached the temperature of zone 70 will tend to enter zone 71 so as to avoid cooling of zone 70 while still allowing the heat collector or source 75 to operate at the most efficient temperatures for supplying heat to the storage system.

Heated water is extracted from the tank 65 through shroud 78 into outlet 80 for use in the utilization system shown as heat extractor 81. The cooled water is returned at inlet 82 which is another elongated, narrow nozzle. The cooled water will tend to enter either zone 71 or zone 72 depending upon its temperature thereby always rendering the coldest water available to be heated by source 75. The temperature detected by sensors 83, 84 and 85 is monitored by control unit 86. If sensor 83 indicates to controller 86 that the temperature of the water being extracted from zone 70 via shroud 78 is below a predetermined value, control unit 86 energizes auxiliary heat source 86 to introduce supplementary heat to exchanger 88. Generally, the auxiliary heat source 87 will be electric power but the system is not limited thereto. Note that controller 86 monitors the temperature differential between sensors 84 and 85 so as to effect pumping controls and the like as described previously.

The system of FIG. 6 can be adapted for cooling by valving the outlet of collector 75 to tank inlet 82 with the collector 75 inlet being connected to 80 which then acts as an outlet for tank 65. Further, heat extractor 81 is valved so that its input is received from 74 and its output coupled to nozzle 76. Also, the control unit 86 operates in inverse fashion relative to sensors 83 and 84. Preferably control unit 86 operates to pump water through the collectors at night for cooling. This dual system function can be realized by adding only four three-way valves in the water circuits and one switch on controller 86 for heat/cool selection.

FIG. 7 shows a cross-section of yet another potential embodiment of a solar heat collector in accordance with the present invention but with a direct heat transfer chamber for an interior area 90. As with the previously described collector, the outer plate 91 is a light transparent glass or plastic as is also the inner plate 92. These plates are held in spaced relation by a mounting frame 89 so as to define a dead air space 93 therebetween. Rear wall 94 and bottom wall 95 which can be formed from a common sheet of material are preferably black light absorbing layers and form a liquid tight chamber 96 filled with heat retaining liquid. Behind wall 94 is the interior wall 97 of room 90. Walls 94 and 97 are held in spaced relation with the airspace 99 therebetween having upper louvered opening 100 which can be opened or closed to allow air circulation as indicated by the arrows in selectably controllable amounts. Thus the solar heat received from black walls 94 and 95 is stored in the liquid within chamber 96 and/or transferred through wall 94 to heat the air in space 99. The thus heated air will tend to rise and exit through opening 100 drawing cooler air into opening 101 to the extent selected by the setting of the louvers (not shown) within or associated with openings 100 and 101. The outer or dead air space 93 provides some thermal insulation which can be supplemented as desired such as by including louvers which are closed when the sunlight is absent, by blowing light weight insulating material in and out of space 93 or by other known arrangements and techniques.

Accordingly, it is apparent that the embodiment of FIG. 7 offers substantially the same advantages as those mentioned previously herein for FIGS. 1 and 2 but which also contains a large volume of fluid for heat storage. The unit is relatively self-contained with surfaces or walls 94 and 95 as well as plates 91 and 92 serving substantially the same operative relationships as the analogous counterparts thereof in FIGS. 1 and 2. The space 93 generally will be somewhat larger than its counterpart shown in FIG. 5 (i.e.: space 29) particularly if it is to accommodate louvers, blown granular insulating material or the like. Of course, heat can be extracted from the water in chamber 96 by other or additional means for use elsewhere if desired.

Although the present invention has been described with particularity relative to the foregoing detailed description of exemplary preferred embodiments, various modifications, changes, additions and applications other than those specifically mentioned herein will be readily apparent to those having normal skill in the art without departing from the spirit of this invention.

What is claimed is:

1. A solar heat collector comprising:
   a substantially flat, light transparent plate;
   an enclosure formed with a flat peripheral edge around a depressed portion with said plate being bonded in sealing relation to said peripheral edge for overlying said depressed portion thereby defining an enclosed chamber, said enclosure including a solar ray heat absorbing layer as substantially all of the inner surface of said chamber, said enclosure having first and second ports therethrough on opposite sides of said chamber so that said first port is located at the upper portion of said chamber and said second port at the lower portion of said chamber when said enclosure is positioned for receiving solar rays generally normal to the flat outer surface of said plate, the lower portion of said chamber being sloped towards said second port when said enclosure is in said solar ray receiving position, said enclosure being of heat insulating material surrounding said chamber on all sides except the side formed by said plate and in backing relation to said heat absorbing layer;
   a substantially light transparent liquid medium filling said chamber between said plate and said heat absorbing layer; and
   means for transferring heat between said liquid medium and a remote location through said ports.

2. A solar heat collector in accordance with claim 1 wherein said heat transferring means includes means for transferring cool said liquid medium with said chamber through said second port and for transferring warm said liquid medium with said chamber through said first port.

3. A solar heat collector in accordance with claim 1 which includes a second substantially flat, light transparent plate, and means mounting said second plate in spaced generally parallel relation to the other said plate with the space therebetween being sealed for forming a thermal barrier between said plates.

* * * * *